(12) United States Patent
Kometani et al.

(10) Patent No.: US 6,979,514 B2
(45) Date of Patent: Dec. 27, 2005

(54) COLLECTOR USED FOR AN ALKALI STORAGE BATTERY

(75) Inventors: Satoru Kometani, Itano-gun (JP); Takashi Nagase, Tokushima (JP); Yoshihiro Masuda, Itano-gun (JP); Hideyuki Asanuma, Itano-gun (JP); Eiji Enishi, Itano-gun (JP); Toshiyuki Kondo, Tokushima (JP)

(73) Assignee: Sanyo Electric Co., Ltd., Osaka (JP)

( * ) Notice: Subject to any disclaimer, the term of this patent is extended or adjusted under 35 U.S.C. 154(b) by 291 days.

(21) Appl. No.: 10/320,382

(22) Filed: Dec. 17, 2002

(65) Prior Publication Data

US 2003/0118899 A1    Jun. 26, 2003

(30) Foreign Application Priority Data

Dec. 17, 2001   (JP) ................ P. 2001-383214

(51) Int. Cl.[7] ................ H01M 2/26; H01M 2/02; H01M 4/02
(52) U.S. Cl. ................ 429/161; 429/164; 429/211
(58) Field of Search ................ 429/161, 164, 429/211, 178

(56) References Cited

U.S. PATENT DOCUMENTS 5,238,757 A * 8/1993 Suzuki et al. ............ 429/94

FOREIGN PATENT DOCUMENTS

JP            11-102688        4/1999

* cited by examiner

*Primary Examiner*—Patrick Joseph Ryan
*Assistant Examiner*—Thomas H. Parsons
(74) *Attorney, Agent, or Firm*—Nixon & Vanderhye P.C.

(57) ABSTRACT

A battery including an outer casing, positive and negative electrodes provided in the outer casing, and an electrolyte provided therebetween. The outer casing is electrically connected to one of the positive and negative electrodes to constitute one of electrode terminals. The other is connected to the other electrode terminal which is electrically insulated from the outer casing. At least one of the positive and negative electrodes and the electrode terminal are connected to each other through a collector, which includes a plate-shaped body section and a connecting piece extended in an almost vertical direction from an end of the body section. The body section or the connecting piece is provided with a bending guide section which can be bent in such a direction that the connecting piece approaches the body section.

4 Claims, 2 Drawing Sheets

COLLECTOR USED FOR AN ALKALI STORAGE BATTERY

BACKGROUND OF THE INVENTION

1. Field of the Invention

The present invention relates to a battery and more particularly to an improvement in a collector for connecting a collector connected to at least one of positive and negative plates and a sealing member.

2. Description of the Related Art

In general, an alkali storage battery such as a nickel-hydride storage battery or a nickel-cadmium storage battery has such a structure that a separator is provided between a positive electrode and a negative electrode and they are wound spirally or laminated, and a collecting lead is then connected to the end of the positive electrode or the negative electrode to form an electrode member, the electrode member is accommodated in a metallic battery case to be an outer casing to weld a collector to a sealing member, and the sealing member is then attached to the opening of the battery case with an insulating gasket provided inbetween and is thus closed tightly.

For example, in FIGS. 5 and 6 showing a square nickel-hydride storage battery, a conductive tab 102 for a positive electrode is protruded from the upper part of an electrode member 101 formed by winding a positive plate and a negative plate through a separator, and a plurality of conductive tabs 102 for a positive electrode are converged and are spot welded to one of the ends of a positive electrode collecting lead 103 and the other end is spot welded to an L-shaped positive electrode collector 108, and a positive electrode cap 106 constituting a positive electrode terminal is provided by tightly sealing the opening of an outer casing 109 through a cover member 105 and a gasket 107 to form a sealing member 104.

In this structure, the positive electrode collector 108 is L-shaped and is constituted by a body section 108a attached along the opening and a connecting piece 108b extended vertically from one of the ends of the body section 108a. The connecting piece 108b is extended vertically from the body section 108a to cause a welded electrode to easily abut thereon when the other end of the collecting lead 103 is to be spot welded. Thus, an assembling property can be enhanced.

However, a space is provided between the sealing cap 106 of a battery and the electrode member 101 and the structure can be obtained also in such a state that the component of a sealing member welded section is extended downward. In order to promote an increase in a capacity, it is necessary to maximize the occupation area of the electrode member 101. For this purpose, however, the space provided above the electrode member 101 is reduced. In the conventional structure, therefore, the increase in a capacity is limited.

In the conventional structure, moreover, the connecting piece 108b of the positive electrode collector 108 is extended vertically. A shown in FIG. 5, therefore, there is a problem in that a space between the tip of the connecting piece 108b and the upper end of the electrode member 101 is small and the positive electrode collecting lead 103 comes in contact with the electrode member 101, thereby causing a short-circuit failure.

SUMMARY OF THE INVENTION

In consideration of the circumstances, the invention has an object to provide a battery which has a high reliability and can increase a capacity.

In the invention, accordingly, the component of a welded section which is extended downward is bent (is folded back along a body section) and is thus accommodated, thereby effectively utilizing a space.

More specifically, the invention provides a battery comprising an outer casing, positive and negative electrodes provided in the outer casing, and an electrolyte provided therebetween, the outer casing being electrically connected to one of the positive and negative electrodes to constitute one of electrode terminals, the other being connected to the other electrode terminal which is electrically insulated from the outer casing, and at least one of the positive and negative electrodes and the electrode terminal being connected to each other through a collector, wherein the collector includes a plate-shaped body section and a connecting piece extended in an almost vertical direction from an end of the body section, and the body section or the connecting piece is provided with a bending guide section which can be bent in such a direction that the connecting piece approaches the body section.

According to such a structure, the collector is constituted to be bent in the vicinity of the boundary portion of the body section and the connecting piece and the bending guide section for promoting a local bending deformation is provided. Therefore, the collector is folded back well so that a space can be utilized effectively, and furthermore, a conduction distance can be reduced between the electrode terminal of the battery and the electrode member and an internal resistance can be decreased. Thus, it is possible to form a battery having a large capacity and a high reliability.

It is desirable that the connecting piece should be constituted by a material having a smaller strength than that of the body section.

It is desirable that the bending guide section should have a smaller thickness than thicknesses of other portions.

Moreover, a second aspect of the invention is directed to a battery comprising an outer casing, positive and negative electrodes provided in the outer casing, and an electrolyte provided therebetween, the outer casing being electrically connected to one of the positive and negative electrodes to constitute one of electrode terminals, the other being connected to the other electrode terminal which is electrically insulated from the outer casing, and at least one of the positive and negative electrodes and the electrode terminal being connected to each other through a collector, wherein the collector is constituted by a plate-shaped body section and a connecting piece folded back from an end of the body section in a direction along the body section.

According to such a structure, the connecting piece is folded back from the end of the body section in the direction along the body section. Therefore, the collector is folded back well so that a space can be utilized effectively, and furthermore, a conduction distance can be reduced between the electrode terminal of the battery and the electrode member and an internal resistance can be decreased. Thus, it is possible to provide a battery having a large capacity and a high reliability.

DESCRIPTION OF THE PREFERRED EMBODIMENTS

Figure 1:
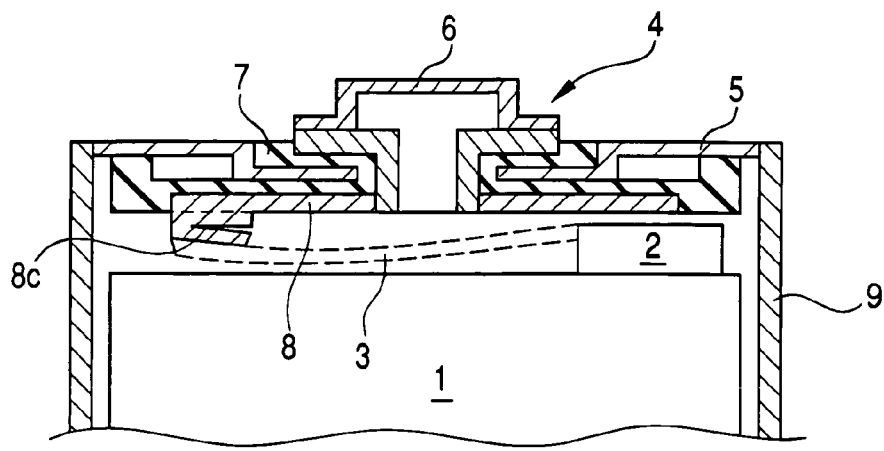
FIG. 1 is a sectional view showing the main part of a battery according to a first embodiment of the invention.
Figure 2:
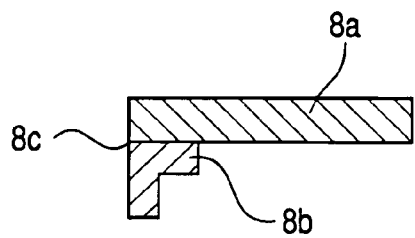
FIG. 2 is a sectional view showing a collector to be used in the battery according to the first embodiment of the invention.

The case in which the invention is applied to a nickel-hydrogen storage battery will be described below in detail with reference to the drawings. FIG. 1 is a sectional view showing the main part of the nickel-hydrogen storage battery to which a collector according to the invention is attached and FIG. 2 is a sectional view showing the collector, including a body section 8a which is constituted by a nickel-plated iron plate and takes a rectangular shape having a hole on a center, and an L-shaped connecting piece 8b attached to the peripheral edge of the body section and formed by a nickel-plated iron plate, the body section 8a and the connecting piece 8b being connected to each other through welding.

In the nickel-hydrogen storage battery, moreover, a collector 8 is formed such that the thickness of the connecting piece 8b is smaller than that of the body section 8a, and can be bent in the vicinity of a boundary portion. The boundary portion is provided with a bending guide section 8c for promoting a local bending deformation. During an assembly, the collector can easily be folded back by means of the bending guide section to effectively utilize a space, and furthermore, a conduction distance between the electrode terminal of the battery and an electrode member can be reduced and an internal resistance can be decreased. A fold-back angle is 30 degrees or less, desirably 15 degrees or less. It is desirable that the connecting piece 8b should be folded back in plane contact with the body section 8a therealong.

Next, description will be given to a nickel-hydrogen storage battery to be formed by using the collector.

1. Fabrication of Electrode Member

The nickel-hydrogen storage battery according to the embodiment has such a structure that three nickel positive plates and four hydrogen occluding alloy negative plates are provided through a separator to form an electrode member 1 as shown in FIG. 1. The nickel positive plate is fabricated by forming a nickel sintered porous member on the surface of a plate core member formed of punching metal and then impregnating the nickel sintered porous member with an active material containing nickel hydroxide as a main constituent by a chemical impregnation method. On the other hand, the hydrogen occluding alloy negative plate is fabricated by impregnating the surface of the nickel sintered porous member formed in the same manner with a negative active material comprising a hydrogen occluding alloy.

These nickel positive plates are put in a bag-shaped separator formed by a nonwoven fabric made of polypropylene and are laminated with the separator provided between the nickel positive plate and the hydrogen occluding alloy negative plate so that a laminated product is fabricated. The end of the punching metal to be the plate core member of the nickel positive plate is exposed from the upper end face of the laminated product, and furthermore, the end of the punching metal to be the plate core member of the hydrogen occluding alloy negative plate is exposed from the lower end face of the laminated product. Thus, there is fabricated the electrode member 1 in which a tab 2 for a positive electrode is welded to the positive electrode core member exposed from the upper end face of the laminated product and the negative electrode core member is exposed from a side peripheral face. The negative electrode active material of an outermost layer is removed to expose the negative electrode core member for a connection to an outer casing.

2. Fabrication of Nickel-Hydrogen Storage Battery (1) First Embodiment

As shown in FIG. 2, a body section 8a is constituted by a nickel plated iron plate having a thickness of 0.5 mm and is formed by a rectangular plate-shaped member having an insertion hole on a center, and an L-shaped connecting piece 8b is attached to the peripheral edge of the body section 8a and is constituted by a nickel plated iron plate having a thickness of 0.3 mm. The body section 8a and the connecting piece 8b are connected to each other through welding.

By providing the connecting piece 8b having a small thickness, thus, the flexibility and elasticity of a collector can be enhanced in a boundary portion and an electrical connection can be achieved well, and furthermore, a space can be made finer. Moreover, a slight positional shift can be absorbed, and a collecting tab and a collector or a sealing member and the collector can be welded to each other easily and reliably.

Moreover, it is also possible to easily carry out a work for caulking and sealing the sealing member into the opening of the outer casing. At a push-in pressure bonding step, similarly, a bending deformation is generated by the bending guide section 8c by pressure such that the vicinity of a welding point can be maintained in an excellent coupling state, and a welded surface can be maintained in a parallel state with the collector and a welded portion can be held well. Accordingly, a storage battery can be manufactured easily.

In the assembly of the nickel-hydrogen storage battery using the collector 8, first of all, the electrode member 1 is accommodated in an outer casing 9 taking the shape of a bottomed cylinder which is obtained by plating iron with nickel (the outer surface of a bottom face acts as a negative electrode external terminal) and a negative electrode core member exposed to the outermost periphery of the hydrogen occluding alloy negative plate is caused to come in contact with the internal wall of the outer casing so that an electrical connection on the negative electrode side can be achieved. Then, the connecting piece 8b of the collector 8 is welded to one of the ends of a collecting tab 3 having the other end connected to the electrode tab 2, and the body section 8a is folded back in a boundary portion with the connecting piece 8b such that the body section 8a comes to the upper part of the electrode member 1.

Thus, the collector 8 and the positive plate of the electrode member are connected to each other and a vibration-proof ring (not shown) is then inserted into the inner peripheral side of the upper part of the outer casing 9, and subsequently, an electrolyte comprising an aqueous 30 mass % potassium hydroxide (KOH) solution is injected into the outer casing 9, and a sealing member 4 is thereafter provided over the opening of the outer casing 9 as shown in FIG. 1. In this case, the bottom face of the sealing member 4 is provided in contact with the collector 8. The sealing member 4 includes a cover member 5 having a circular downward protruded portion formed on a bottom face and a positive electrode cap (a positive electrode external terminal) 6 having a peripheral edge in which an insulating gasket 7 is fitted, and a vent hole is formed on the center of the cover member 5.

Consequently, a square nickel-hydrogen storage battery having a nominal capacity of 700 mAh shown in FIG. 1 is fabricated.

(2) Second Embodiment

Figure 3:
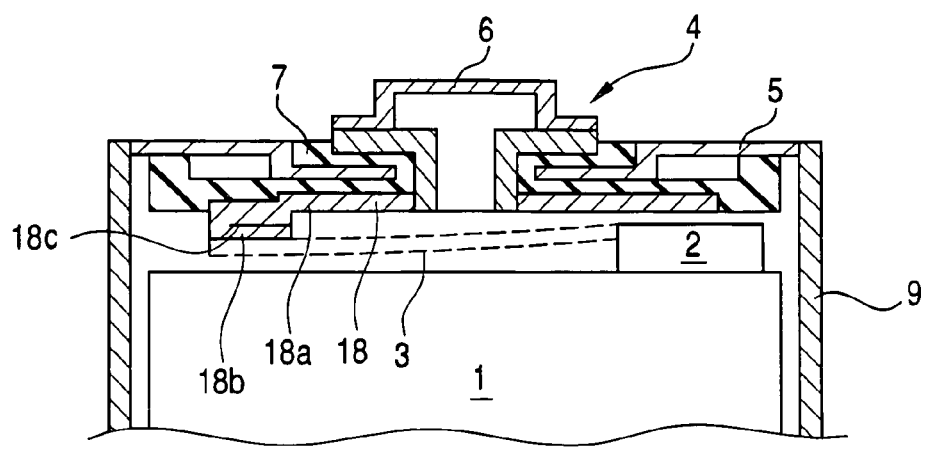
FIG. 3 is a sectional view showing the main part of a battery according to a second embodiment of the invention.
Figure 4:
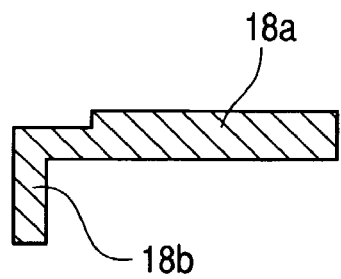
FIG. 4 is a sectional view showing a collector to be used in the battery according to the second embodiment of the invention.

FIG. 3 is a view showing a battery using a collector according to a second embodiment and FIG. 4 is a sectional view showing the collector. An electrode member 1 to be used in the second embodiment is the same as that of the first embodiment. In the second embodiment, the electrode member 1 is formed integrally, and the collector is press molded to have a small thickness in the vicinity of the boundary portion of a body section 18a and a connecting piece 18b and is formed by a nickel plated iron plate constituting a bending guide section 18c, and has the same L-shape as that in the first embodiment.

By integrally forming the connecting piece 18b having a small thickness, thus, it is not necessary to bond the collector 18 itself by welding. In the same manner as in the first embodiment, moreover, the flexibility and elasticity of the collector can be enhanced and a strength is reduced in the boundary portion. Consequently, an electrical connection can be achieved well, and furthermore, the collector can easily be bending molded so that a space can be made finer. Moreover, a slight positional shift can be absorbed, and a collecting tab and a collector or a sealing member and the collector can be welded to each other easily and reliably.

(3) Comparative Example

Figure 5:
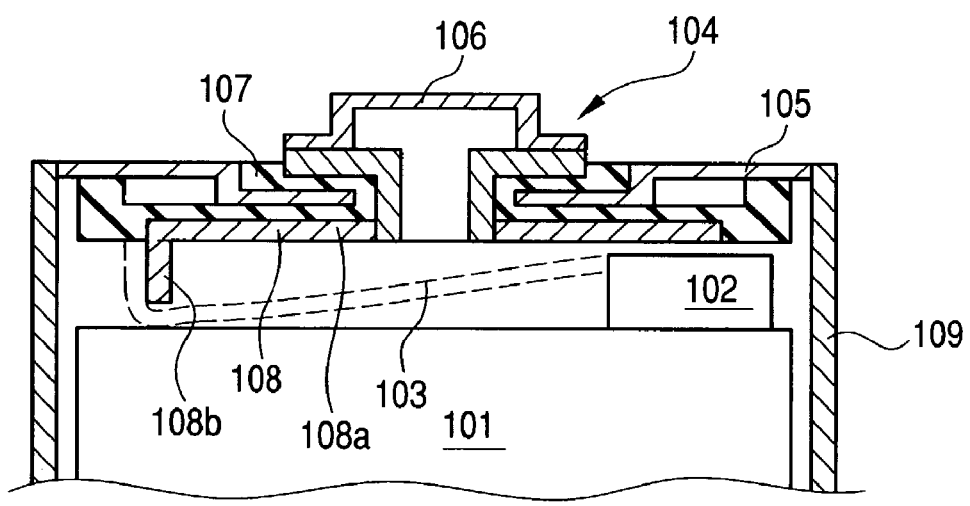
FIG. 5 is a sectional view showing the main part of a battery according to a conventional example.
Figure 6:
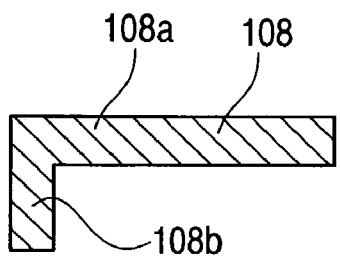
FIG. 6 is a sectional view showing a collector to be used in the battery according to the conventional example.

As a comparative example, a battery (FIG. 5) is formed by using an L-shaped collector 108 shown in FIG. 6 in just the same manner as in the embodiments. As a comparative example 1, a positive electrode size and a negative electrode size are slightly reduced, and the upper space of a plate group is correspondingly increased as in the conventional art. As a comparative example 2, the upper space of a plate group is reduced in the same manner as in the first and second embodiments and a conventional collector is used.

3. Battery Characteristic Test

The following table shows a short-circuit defective rate measured by using the batteries according to the embodiments which are thus fabricated and the conventional example.

TABLE 1

| | Comparative Example 1 | Comparative Example 2 | First Embodiment | Second Embodiment |
|---|---|---|---|---|
| Battery size (mm) | 35.0 × 16.4 × 5.6 | 35.0 × 16.4 × 5.6 | 35.0 × 16.4 × 5.6 | 35.0 × 16.4 × 5.6 |
| Nominal capacity (mAh) | 650 | 700 | 700 | 700 |

TABLE 1-continued

| | Comparative Example 1 | Comparative Example 2 | First Embodiment | Second Embodiment |
|---|---|---|---|---|
| Positive electrode size (mm) | 15.0 × 27.0 | 15.0 × 30.0 | 15.0 × 30.0 | 15.0 × 30.0 |
| Negative electrode size (mm) | 15.0 × 28.0 | 15.0 × 30.5 | 15.0 × 30.5 | 15.0 × 30.5 |
| Upper space of plate group (mm) | 2.8 | 1.4 | 1.4 | 1.4 |
| Defective rate (%) | 0.35 | 60.0 | 0.40 | 0.32 |

As is apparent from the result, according to the invention, the collector is bending molded and accommodated so that a capacity can be increased and the defective rate can be set to be equivalent to that of the conventional example. On the other hand, when the upper space of the plate group is reduced equivalently to that in each of the embodiments according to the invention, the defective rate is increased to 60%. Consequently, it is apparent that the capacity is hard to increase with the same size of an outer casing in the case in which the collector according to the conventional example is used.

As is apparent from the comparison, according to the invention, it is possible to increase the capacity with the same size of the outer casing and it is also possible to set a yield to be equal to or more than that in the case in which the capacity is small.

Moreover, there was measured a short-circuit defective rate when the thickness of the thin portion in the vicinity of the boundary portion of the collector according to the second embodiment is reduced to 40%, 50%, 60%, 70% and 80% of an original thickness of 0.3 mm. The result is shown in Table 2.

TABLE 2

| | 30% | 40% | 50% | 60% | 70% | 80% |
|---|---|---|---|---|---|---|
| Short-circuit defective rate | 1.31% | 0.34% | 0.36% | 0.31% | 0.32% | 1.47% |

As a result, it is possible to carry out bending accommodation by crushing to have a thickness of approximately 40% to 70%, thereby reducing the defective rate.

Moreover, it is possible to regulate the strength of a bent portion by carrying out annealing, laser irradiation or etching for a bent and deformed portion.

Furthermore, it is also possible to change a material, for example, to form the connecting piece by a material having a small hardness such as nickel.

Alternatively, a slit may be formed as the bending guide section in the connecting piece to promote the bending deformation.

By using the collector having the bending guide section in the boundary portion, thus, the deformation is carried out easily and uniformly upon receipt of pressure during pressure bonding and the distance between the sealing member and the collector (electrode) is reduced as shown in the sectional view of FIG. 1 illustrating the state obtained after the pressure bonding. Consequently, a resistance can be reduced.

While the sealing member is set to be the positive electrode terminal and the outer casing is set to be the negative electrode terminal in the embodiments and the variants, the sealing member may be set to be the negative electrode terminal and the outer casing may be set to be the positive electrode terminal. In this case, the positive electrode collector is welded to the inner bottom face of the outer casing of the battery and the bottom face of the sealing member is welded to the negative electrode collector through the collector.

Furthermore, while the electrode member is attached to the outer casing, the collecting lead is welded and the electrolyte is then injected in the embodiments, there is taken a procedure for attaching the electrode member to the outer casing with a solid electrolyte interposed between a positive electrode and a negative electrode and welding, sealing and pressure bonding the collector in the case of a battery using the same electrolyte.

Moreover, while the example in which the invention is applied to the nickel-hydrogen storage battery has been described in the embodiments and the variants, it is apparent that the invention is not restricted to the nickel-hydrogen storage battery but can also be applied to other storage batteries such as a nickel-cadmium storage battery.

It is desirable that the connecting piece should be constituted by a thinner material than the body section.

It is desirable that the connecting piece should be constituted to have a thickness of 70% or less of the thickness of the body section.

It is desirable that the connecting piece should be bonded to the body section by welding.

According to each of the structures, bending can easily be carried out at the connecting piece.

The method according to the invention may comprise the steps of providing positive and negative electrodes in an outer casing including an opening serving as the terminal of one of the electrodes, providing a plate-shaped body section and a connecting piece extended in an almost vertical direction from the end of the body section on one of the electrodes, welding one of the ends of a collector provided with a bending guide section for promoting a local bending deformation such that bending can be carried out in the vicinity of the boundary portion of the body section and the connecting piece and welding the other end of the collector to a sealing member serving as the terminal of the other electrode, and providing the sealing member in the opening of the outer casing, caulking and sealing the outer casing, and furthermore, folding back the collector at the bending guide section and pressure bonding the connecting piece along the body section.

According to such a structure, the collector can easily be bent at the bending guide section, the connecting distance between the electrode member and the electrode terminal can be reduced and a resistance can be decreased. Thus, it is possible to easily form a battery having a large capacity and a high reliability.

In the invention, moreover, the bending guide section is previously formed in the collector. Therefore, it is possible to provide the sealing member in the opening of the outer casing such that the electrode member and the sealing member reliably come in contact with each other through the collector with an excellent contact property. Also in the case in which there is used a so-called direct welding method for causing a welding current to flow between the outer casing and the sealing member and conducting both electrodes through an electrolyte, thereby carrying out the welding, furthermore, it is possible to pressurize a contact section during the welding. Consequently, the collector is welded well to one or both of the sealing member and the electrode member (through the collector lead) without generating a "welding surface flash". Therefore, if the collecting lead has such a length as to cause the sealing member to come in contact with the collector, it is welded to the sealing member or the collector. Also in the case in which the outer casing is caulked and sealed, a more correct horizontal state can be maintained and reliable welding can be carried out. Also in the caulking, it is possible to eliminate the shift of a welding point and to enhance a yield without applying a nonuniform stress to the welding point in an oblique direction.

As described above, according to the invention, the collector is folded back well and the space can be utilized effectively, and furthermore, the conduction distance between the electrode terminal of the battery and the electrode member can be reduced and the internal resistance can be decreased. Thus, it is possible to form a battery having a large capacity and a high reliability.

What is claimed is:

1. A battery comprising:
an outer casing that functions as a first electrode terminal by electrically connecting the outer casing to one of positive and negative electrodes;
a second electrode terminal which is electrically insulated from the outer casing and connected to the other one of the positive and negative electrodes through an electrode tab, a collecting tab and a collector; and
a laminated product provided in the outer casing in which the positive and negative electrodes and an electrolyte are laminated, wherein
said electrode tab is connected to the other one of the positive and negative electrodes to be exposed from an upper end face of the laminated product, and said electrode tab and said collector are connected by said collecting tab such that the electrode tab is connected at one end portion of the collecting tab whereas the collector is connected to an opposite end portion thereof, wherein,
the collector includes a plate-shaped body section and a connecting piece extended in a downward direction from an end of the body section, one of the body section or the connecting piece is provided with a bending guide section which can be bent in such a direction that the connecting piece approaches the body section, wherein
said connecting piece of the collector and the collecting tab with said bending guide section being bent are disposed in a space between an upper end of the electrode tab and the upper end face of the laminated product.

2. The battery according to claim 1, wherein the connecting piece is constituted by a material having a smaller strength than that of the body section.

3. The battery according to claim 1, wherein the bending guide section has a smaller thickness than thicknesses of the body section and the connecting piece.

4. A battery comprising:
an outer casing that functions as a first electrode terminal by electrically connecting the outer casing to one of positive and negative electrodes;
a second electrode terminal which is electrically insulated from the outer casing and connected to the other one of the positive and negative electrodes through an electrode tab, a collecting tab and a collector; and
a laminated product provided in the outer casing in which the positive and negative electrodes and an electrolyte are laminated, wherein said electrode tab is connected to the other one of the positive and negative electrodes to be exposed from an upper end face of the laminated product, and said electrode tab and said collector are connected by said collecting tab such that the electrode tab is connected at one end portion of the collecting tab whereas the collector is connected to an opposite end portion thereof, wherein, the collector includes a plate-shaped body section and a connecting piece extended in a downward direction from an end of the body section, one of the body section or the connecting piece is provided with a bending guide section which can be bent in such a direction that the connecting piece approaches the body section, wherein said electrode tab is exposed in a space on one side of the upper end face of the laminated product, and said connecting piece of the collector and the collecting tab with said bending guide section are disposed in a space on an opposite side of the upper end face of the laminated product.

\* \* \* \* \*